United States Patent
Jeppesen

(10) Patent No.: US 6,490,557 B1
(45) Date of Patent: Dec. 3, 2002

(54) METHOD AND APPARATUS FOR TRAINING AN ULTRA-LARGE VOCABULARY, CONTINUOUS SPEECH, SPEAKER INDEPENDENT, AUTOMATIC SPEECH RECOGNITION SYSTEM AND CONSEQUENTIAL DATABASE

(76) Inventor: John C. Jeppesen, 8220 Edison Dr., Ventura, CA (US) 93001

( * ) Notice: Subject to any disclaimer, the term of this patent is extended or adjusted under 35 U.S.C. 154(b) by 0 days.

(21) Appl. No.: 09/261,924

(22) Filed: Mar. 3, 1999

Related U.S. Application Data

(60) Provisional application No. 60/076,998, filed on Mar. 5, 1998.

(51) Int. Cl.[7] .............................................. G10L 15/00
(52) U.S. Cl. ........................ 704/235; 704/256; 704/232
(58) Field of Search ................................ 704/251, 260, 704/235, 200, 255, 256, 257, 246, 266, 270, 232

(56) References Cited

U.S. PATENT DOCUMENTS

| | | | | |
|---|---|---|---|---|
| 4,985,929 A | * | 1/1991 | Tsuyama | 382/48 |
| 5,649,060 A | * | 7/1997 | Ellozy et al. | 704/278 |
| RE35,658 E | * | 11/1997 | Jeppesen | 705/1 |
| 5,745,875 A | * | 4/1998 | Jackson et al. | 704/235 |
| 5,960,385 A | * | 9/1999 | Skiena et al. | 704/9 |
| 6,023,675 A | * | 2/2000 | Bennett et al. | 704/235 |
| 6,122,613 A | * | 9/2000 | Baker | 704/235 |
| 6,173,259 B1 | * | 1/2001 | Bijl et al. | 704/235 |

\* cited by examiner

*Primary Examiner*—Richemond Dorvil

(57) ABSTRACT

The present invention is embodied in a system and method for recognizing speech and transcribing speech in real time. The system includes a computer, which could be in a LAN or WAN linked to other computer systems through the Internet. The computer has a controller, or similar device, to filter background noise and convert incoming signals to digital format. The digital signals are transcribed to a word list, which is processed by an automatic speech recognition system. This system synchronizes and compares the lists and forwards the list to a speech recognition learning system, which stores the data on-site. The stored data is forwarded to an off-site storage system, and an off-site large scale learning system that processes the data from all sites on the wide area network system.

17 Claims, 3 Drawing Sheets

METHOD AND APPARATUS FOR TRAINING AN ULTRA-LARGE VOCABULARY, CONTINUOUS SPEECH, SPEAKER INDEPENDENT, AUTOMATIC SPEECH RECOGNITION SYSTEM AND CONSEQUENTIAL DATABASE

This application claims the benefit of U.S. No. 60/076, 998. filed Mar. 5, 1998

FIELD OF THE INVENTION

The present invention generally relates to a system and method for recognizing speech and transcribing speech.

BACKGROUND OF THE INVENTION

A speech recognition system analyzes speech to determine what was said. In a frame based system, a processor divides a signal descriptive of the speech to be recognized into a series of digital frames, each of which corresponds to a small time increment of the speech. The processor then compares the digital frames to a set of stored models, each of which represents a word from a vocabulary, and may represent how that word is spoken by a variety of speakers. A speech model may also represent a phoneme that corresponds to a part of a word. Collectively, phonemes represent the phonetic spelling of the word.

The processor determines what is said by finding the model that best matches the digital frames that represent the speech. The words or phrases corresponding to the best matching model are referred to as recognition candidates. The processor may be part of a general purpose computer with an input/output unit, a sound card, memory, and various programs including an operating system, application program such as a word processing program], stenographic translation processor, and a speech recognition program. The input/output unit could include devices such as microphone, mouse, keyboard, monitor, stenographs and video data.

The system detects the speech through a speech recognition program. The speech may be conveyed from an analog signal to a sound card and then through a converter to be transformed to a digital format. Under the control of an operating system the speech recognition program compares the digital samples to speech models. These results may be stored or used as input to the application program. Speech programs and application programs can run concurrently so for example, a speaker can use a microphone as a text input device, alone or in conjunction with a mouse and keyboard. The speaker interacts through a GUI.

A speech recognition system may be a "discrete system" which pauses between words or phrases, or it may be "continuous", where the system recognizes words and phrases without the speaker having to pause between them. Such systems relate to down-line transcription used by attorneys reviewing real-time transcription during a proceeding such as a trial or deposition, or for the manipulation of audio and video transcripts by attorneys, judges, court reporters, witnesses and clients. A stenographic recorder is a machine used in this process, which may be backed up by a tape recording. The stenographic recorder may link to a computer aided transcription [CAT] system to transcribe stored electronic key-strokes. This system requires the reporter to work inter-actively with the CAT system to correct errors, often with the aid of a taped recording.

As the use of stenotype machines in this process, results in a high incidence of errors through undefined strokes improved processors have been incorporated into the translation systems. These include a means for providing a sequence of lexical stroke symbols and the processor for receiving them. This processor could have a scan chart memory storing a list of stroke symbol combinations and text part translations. Also, the system would have a means of combining language parts according to a set of defined rules to complete words in language text format. In addition, a speech recognition system for converting audio data to frame data sets with a stored vocabulary, as clusters of word models that can be compared and recognized by a processor system, would be linked to an output system defining the text.

While systems have been introduced with continuous speech recognition capability aimed at enabling direct voice to text capabilities, these systems generally are restricted. In the case of audio input they may be limited in only being able to recognize one user. Secondly, the systems have difficulty in processing bursts of rapid speech. The problem of dialects and accents have not been over come, and the systems require hands on personal training. Background noise often interferes with optimum training sessions leading to a confusion of developmental data being processed by the automatic speech recognition [ASR] system and the storage of an inaccurate data base. Overall, the lack of predictable consistency in error free operation and the difficulties in scaling [using unreasonably large training sets] have yet to be addressed.

Therefore, what is needed is a system and method that is efficient in terms of time frame and being trainable by more than one voice, including various accents and dialects. Further, what is needed is a system capable of handling continuous speech at various rates in a consistent and reliable manner. In addition, what is needed is a system that will eliminate background noise and solve the scaling problem incurred by large data sets.

SUMMARY OF THE INVENTION

To overcome the limitations in the prior art described above, and to overcome other limitations that will become apparent upon reading and understanding the present specification, the present invention is embodied in a system and method for recognizing speech and transcribing speech.

The system includes a computer, which, could be in a LAN or WAN linked to other computer systems through the Internet. The computer has a controller, or similar device, to filter background noise and convert incoming signals to digital format. The digital signals are transcribed to a word list which is processed by an automatic speech recognition system. This system synchronizes and compares the lists and forwards the list to a speech recognition learning system that stores the data on-site.

The stored data is forwarded to an off-site storage system, and an off-site large scale learning system that processes the data from all sites on the wide area network system. Users of the system can access the off-site storage system directly. The system solves the scaling problem by providing an efficient method of generating large training sets for multi-varied word patterns.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawing that illustrates the preferred embodiment. Other features and advantages will be apparent from the following detailed description of the preferred embodiment, taken in conjunction with the accompanying drawings, which illustrate, by way of example, the principles of the invention.

DETAILED DESCRIPTION OF THE PREFERRED EMBODIMENTS

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Figure 1:
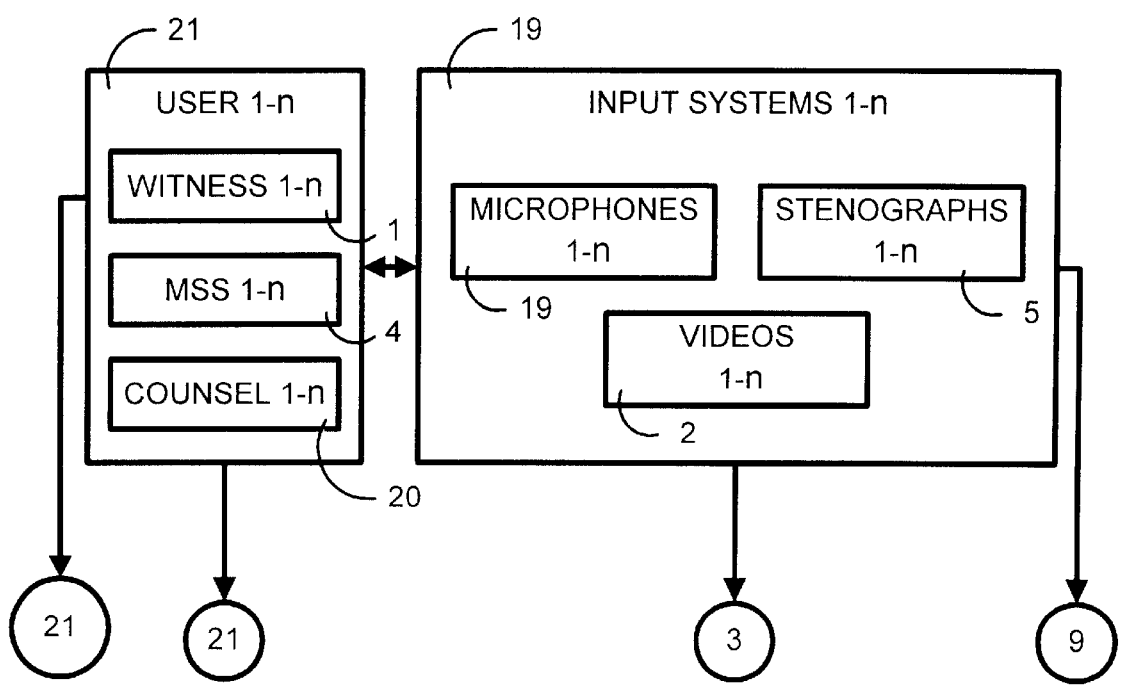
FIGS. 1–3 show a block diagram of an overall automatic speech recognition system incorporating the present invention.
Figure 2:
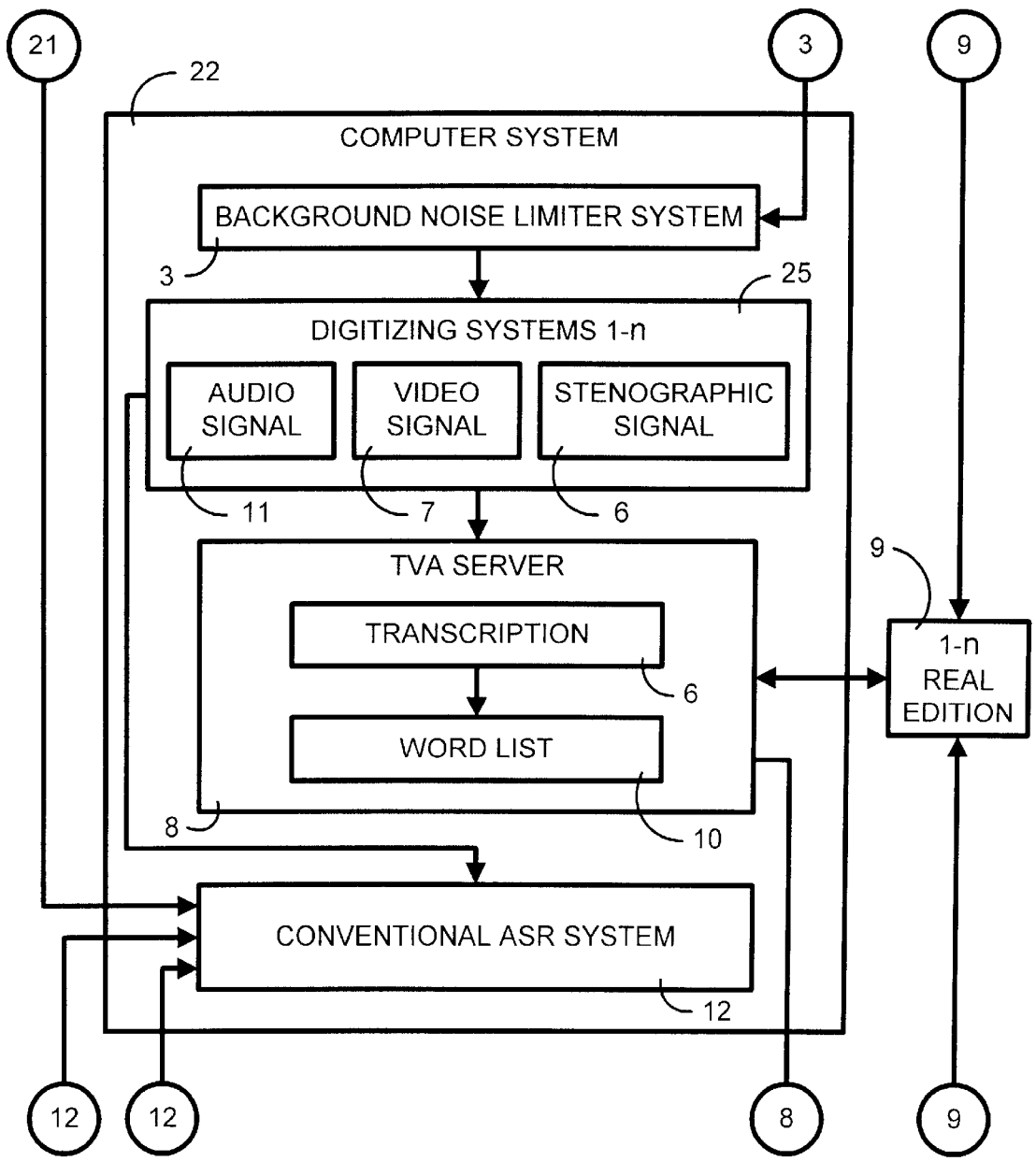
Figure 3:
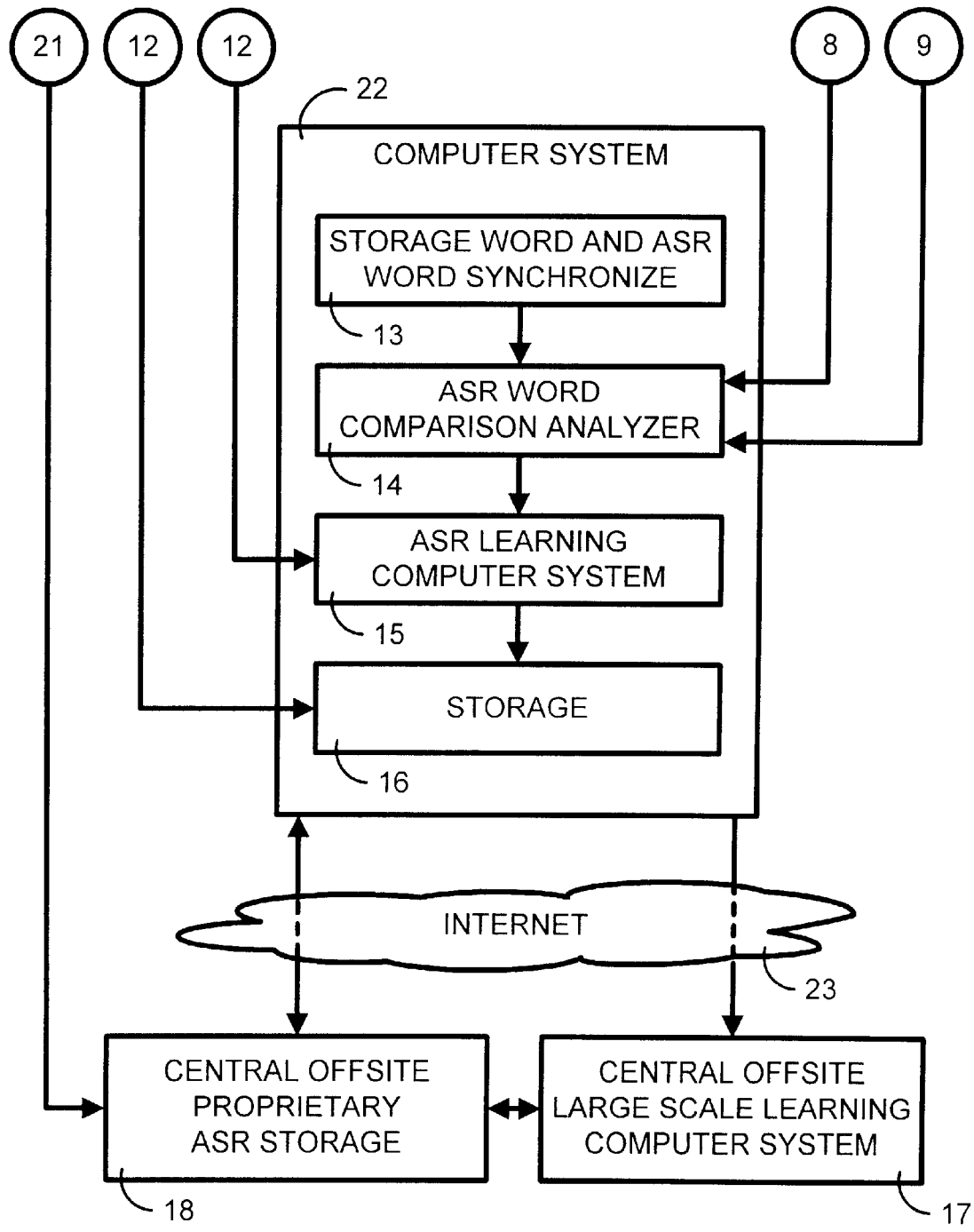

FIGS. 1–3 shows a block diagram of an automatic speech recognition [ASR] system incorporating the present invention. The system is part of a computer network system 22 that could be part of a LAN or WAN, which may be linked to other users 21 or systems 19, through the Internet 23. The system can be used with synchronization systems, such as U.S. RE Pat. No. 35,658, entitled "Computerized Court reporting System", which is incorporated herein by reference.

In a preferred embodiment of the present invention, a user 1-n, 21, which may be a witness, machine shorthand stenographer, a counselor, or other free resource such as the output of either court, closed-caption, or deposition reports from unprotected depositions] initializes the computer system 22 by entering speech background parameters for the various inputs to the input system 19.

These parameters could include a speech dictionary, machine parameters, neural network synaptic weight settings, field programmable gate array [FPGA] reconfiguration settings, generic starting dictionary or other appropriate automatic learning response mechanisms, such as Hidden Markov Models. The user 1-n 21 then uses an input system 1-n, 19 which may include microphones 1-n, 24, stenograph machines 1-n, 5, videotapes 1-n, 2 or other means which could include disc, audio tape, or digital or analog signal etc.

The input system 1-n, 19 data are transferred from a computer in the local system 22, or from a source outside the local system 22. The computer system 22 has a controller, a background noise limiter system 3 that filters background noise from the input systems 1-n, 19 data. This controller is an artificial intelligence programmed to filter non-relevant noise.

To ensure minimization of background noise, a studio type environment is preferred using unidirectional microphones and a Depo Referee to control simultaneous over talk and rate of speech. The data with the background noise filtered out is then transferred to a controller, digitizing systems 1-n 25, that converts data to digital format. The audio signal 11 converts audio data, the video signal 7 converts video text and audio, and the stenographic signal 6 converts stenotype. These data are processed simultaneously so as to produce corresponding signals in the same time frame. The digitized signals are time sequentially stored in SMPTE format in the TVA server 8.

The TVA server 8 may be accessed on-line by the real time editor 1-n, 9. This editor 9 utilizes the text-to-audio synchronized data files to continuously make corrections utilizing feedback through the input systems 1-n 19. This corrected file is transcripted by the transcription processor 6 and becomes the word list 10. This word list 10 is the basis for word recognition to be used in training the neural networks of the system.

Once the data has been proofed by the editor 9, the word list 10 is forwarded to the ASR word comparison analyzer 14 to compare its best guess to the data received. This best guess derives from the digitizing system 1-n 25 and received for processing by the conventional ASR system 12 incorporating an HMM or other suitable speech modeling algorithm. The conventional ASR system receives continual speech modeling parametric data from the ASR learning computer system 15 for learning purposes. This partly achieved by performing a string search for the most recently learned best guess, reflected in the vocabulary synaptic configuration in storage 16. Simultaneously, storage 16 is continuously updated from the ASR learning computer system 15, and the central off-site proprietary ASR storage 18.

After the conventional ASR system 12 determines the best guess, this data is transferred to the stroke word and ASR word synchronizer 13 which creates an association between the transcription 6 word and the ASR word. Once synchronized, the words from the various input systems 1-n 19, are analyzed by the ASR word comparison analyzer 14. If the best guess of the ASR word comparison analyzer 14 matches the entry stored in the word list 10, that data flows directly to the ASR learning computer system 15. The ASR learning computer system 15 can be any controller, hardware, software etc., to provide the artificial intelligence capabilities of the system. The artificial neural networks could be heuristic algorithm technique based on HMM techniques, or other techniques.

Once the correct response is noted and has reinforced the ANN it is stored 16. However if the guess of the conventional ASR 12 is incorrect, the ASR learning computer system 15 uses an heuristic algorithm and the ANN to reset the FPGAs to provide a corrective mechanism. Improved data signals are sent to the conventional ASR system 12 from the ASR learning computer system 15 and to storage 16.

Each successive input with identical users 1-n 21 results in an increased ability of the conventional ASR system 12 to provide correct responses for that user and therefore a larger more accurate storage 16. In addition the storage 16 receives dictionary update signals from the central off-site proprietary storage 18, and both storage devices continuously feed data in real time to the central off-site large scale learning computer system 17. The central off-site large scale learning computer system 17, because it is receiving data from all sources in the network, is best situated to develop generic speaker type ASR dictionaries. These dictionaries, not shown, could be downloaded to individual speaker systems as appropriate.

As these systems are used more extensively the ANNs would increase the accuracy for automated speech recognition. Through the utilization of these systems the scaling problem would be solved, and the invention would permit unlimited training of automated speech recognition.

The foregoing description of the preferred embodiments of the invention has been presented for the purposes of illustration and description. It is not intended to be exhaustive or to limit the invention to the precise form disclosed. Accordingly, the foregoing description should be regarded as illustrative rather than restrictive, and it should be appreciated that variations may be made in the embodiments described by workers skilled in the art without departing from the scope of the present invention as defined by the following claims.

What is claimed is:

1. A method for training an automatic speech recognition (ASR) computer system, the method comprising:

creating finalized transcript data with plural machine shorthand stenographers (MSS) that utilize computer-aided-transcription (CAT) software and text-to-audio synchronizing;

geographically locating each MSS in an area intended to capture particular accents and or dialects;

electronically linking MSS data together in coordinated form;

training the automatic speech recognition computer system with the finalized transcript data created by the plural machine shorthand stenographers.

2. The method of claim 1, further comprising gathering final transcript data specifically from at least one of legal depositions, courtroom testimony, and media captioning.

3. The method of claim 1, further comprising electronically linking data performed via at least one of a local area network and a wide area network.

4. The method of claim 1 further comprising an automatic speech recognition computer system with a neural network.

5. The method of claim 1 further comprising providing an automatic speech recognition computer system with an analog computer.

6. The method of claim 1 further comprising utilizing a real-time editor with one or more machine shorthand reporters.

7. The method of claim 1 further comprising utilizing real-time editor electronically linked to one or more machine shorthand stenographers via at least one of a LAN, WAN, and the Internet.

8. An automatic speech recognition system or network trained by plural machine shorthand stenographers comprising:

a speech recognition computer or network having the ability to learn from training data input thereto;

plural machine shorthand stenographers located geographically so as to capture certain and particular dialects and or accents;

computer-aided-transcription software and audio synchronizing systems utilized by these plural machine shorthand stenographers to create final transcript data outputs;

using the final transcript data outputs as training data set inputs for the purpose of training the automatic speech recognition computer system or network.

9. The automatic speech recognition system of claim 8 wherein the system is a neural network.

10. The automatic speech recognition system of claim 8 wherein the system is an analog computer.

11. The automatic speech recognition system of claim 8 wherein the system is a massively parallel computer system.

12. The automatic speech recognition system of claim 8 where the system uses Field Programmable Gate Array (FPGA) processors.

13. The automatic speech recognition system of claim 8 wherein the system is based on Hidden Markov Models (HMM).

14. The automatic speech recognition system of claim 8 wherein the learning utilizes a heuristic algorithm.

15. The automatic speech recognition system of claim 8 wherein the finalized transcript data outputs are derived from at least one of legal depositions, courtroom testimony and media captioning.

16. The system or network of claim 8 and additionally comprising utilization of a real-time editor or editors with one or more machine shorthand stenographers.

17. The automatic speech recognition system of claim 16 further comprising a real-time editor electronically linked to one or more machine shorthand stenographers via at least one of a LAN, WAN, and the Internet.

* * * * *